United States Patent

Krenciprock

Patent Number: 5,284,377
Date of Patent: Feb. 8, 1994

[54] SECURITY WINDOW WIND DEFLECTOR

[76] Inventor: Russell C. Krenciprock, 1852 James B Dr., McDonald, Ohio 44437

[21] Appl. No.: 906,478

[22] Filed: Jun. 30, 1992

[51] Int. Cl.$^5$ .................................... B60J 1/20
[52] U.S. Cl. ...................... 296/154; 296/152; 296/37.9; 454/131
[58] Field of Search .............. 296/152, 37.9, 37.11, 296/154; 454/128, 131, 133, 135

[56] References Cited

U.S. PATENT DOCUMENTS

| | | | |
|---|---|---|---|
| 1,628,053 | 5/1927 | McTighe | 296/152 X |
| 1,928,184 | 9/1933 | Moore | 296/152 |
| 2,459,459 | 1/1949 | Seaman | 296/37.11 |
| 2,468,439 | 4/1949 | Gregorius | 296/152 X |
| 2,576,019 | 11/1951 | Kisselle | 296/37.11 X |
| 2,599,015 | 6/1952 | Pritchard | 296/152 |
| 3,905,639 | 9/1975 | Montgomery | 296/37.11 |
| 4,558,633 | 12/1985 | Lingg | 296/152 X |
| 4,685,718 | 8/1987 | Steenblik et al. | 296/154 |
| 4,923,241 | 5/1990 | Miller | 296/154 |

FOREIGN PATENT DOCUMENTS

| | | | |
|---|---|---|---|
| 157641 | 8/1953 | Australia | 296/154 |
| 211687 | 11/1957 | Australia | 296/152 |
| 569831 | 8/1958 | Belgium | 296/154 |
| 477152 | 9/1951 | Canada | 296/152 |
| 12441 | 7/1953 | Fed. Rep. of Germany | 296/154 |
| 2591951 | 6/1987 | France | 296/154 |
| 223519 | 12/1984 | Japan | 296/152 |
| 871556 | 6/1961 | United Kingdom | 296/154 |

*Primary Examiner*—Joseph D. Pape
*Attorney, Agent, or Firm*—John P. Halvonik

[57] ABSTRACT

The invention is a novel wind deflector for attachment to auto windows. The wind deflector has an extended flange that borders the upper edge of the deflector and is sized to fit into the window groove that exists in the window structure of most automobiles. Additional securing bolt(s) is also used to secure the deflector to the window structure. An optional ash tray bridges the outside with the interior of the auto and provides an apparatus to vent cigarettes, etc. to the outside.

5 Claims, 2 Drawing Sheets

SECURITY WINDOW WIND DEFLECTOR

BACKGROUND OF THE INVENTION

The invention relates to the field of deflectors and, in particular, to a wind deflector that is shaped in two directions and may be attached to the window slot of automobiles.

DESCRIPTION OF THE PRIOR ART

While there are wind deflectors that exist in the prior art, none that applicant is aware of can be secured in the window slot that exists at the top of the window structure of cars. Securing bolts and optional venting ash trays are also unknown in the prior art to the applicant's knowledge.

SUMMARY OF THE INVENTION

The invention is a window wind deflector that may be set up in the windows of autos. The deflector has a narrow flange portion along the upper edge of the deflector that is relatively narrow enough to slip into the window slot in the top of the window structure of the auto. The flange secures the deflector in place and an additional bolt(s) also provide secondary securing by connection the deflector directly to the window structure. An optional ash tray pops out as needed in order to provide a means to vent ashes from cigarettes, etc.

It is an object of the invention to provide a wind deflector that may be easily set up inside the window spaces of autos.

Another object of the invention is to provide a wind deflector for autos that can be readily molded into the proper curvature for a deflector.

Yet another objective is to provide a wind deflector with an ash tray device to vent ashes to the outside.

Yet another is to provide a security means that discourages passersby from placing their hands inside windows.

Other objectives of the invention will become apparent to those skilled in the art once the the invention has been shown and described.

DESCRIPTION OF THE PREFERRED EMBODIMENT

The deflector of the present invention may be shaped or molded out of thermoplastic material and should be curved in several directions as shown. The deflector should be of convex shape, i.e. curving outward form the auto. This curvature provides an aerodynamic shape to the deflector and helps the deflector fit into most automobiles and trucks.

The upper flange 1 of the deflector is also likely to be curved in order to conform to the generally curved upper edges of the window opening that exist in many autos. It is thought that the deflectors may need to be custom molded in order to fit autos/trucks with uncommon window curves and/or shapes.

Figure 4:
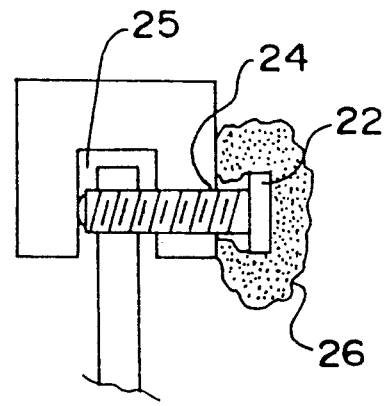
FIG. 4. Shows the preferred securing means.

The upper flange 1 of the deflector should be narrow enough to fit the slot 25 that exists in the top of the window structure of the car, see FIG. 4. This slot normally provides a means to secure windows when they are rolled up. For the present invention, it makes a handy space to secure the deflector to the window area.

Figure 1:
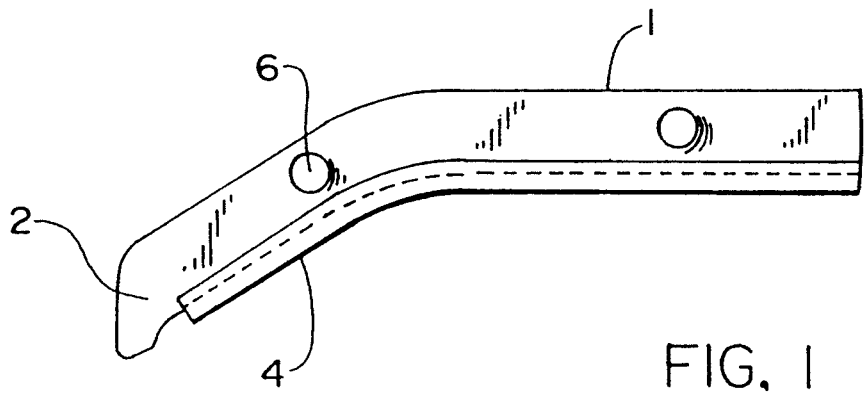
FIG. 1. Shows overall construction of the deflector.
Figure 2:
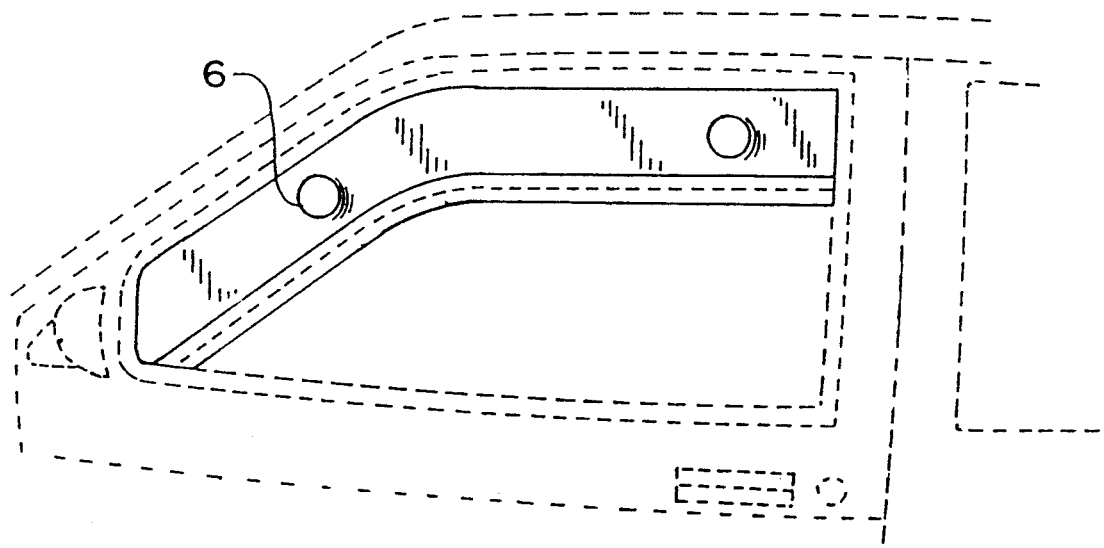
FIG. 2. Shows the deflector in use.
Figure 3:
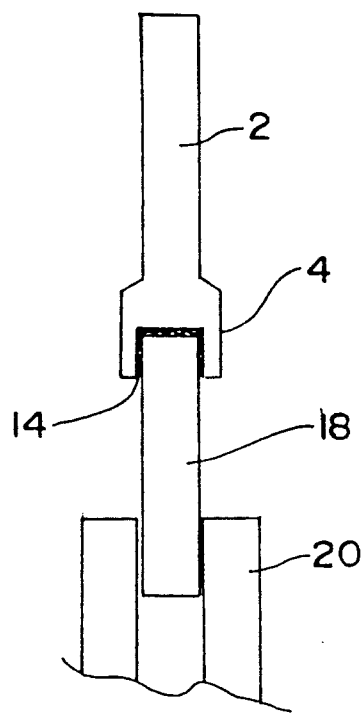
FIG. 3. Shows the window attachment groove.

The lower edge 4 of the deflector should have a channel 14 in order to secure the top edge of a window 18, see FIG. 3 (the auto door is 20). The channel may come with weather stripping in order to provide a somewhat water proof seal with the window. The lower edge is likely to curve downward as shown in FIG. 1 in order to accommodate the modern day windows of vehicles.

The securing bolt 22 may be nothing more than a nail, bolt, or thumbscrew, see FIG. 4. There may be one, or preferably, two holes, drilled near the upper edge of the deflector with corresponding holes 24 drilled in the upper edges of the window structure of the auto, see FIG. 4. A bolt or nail 22 may be placed through both apertures in order to secure the deflector. The bolt may be pried out of place by the user by pulling on the head of the bolt, etc. The top of the bolt may come with an adhesive e.g. putty 26 to secure the bolt in place in the window slot.

Figure 5:
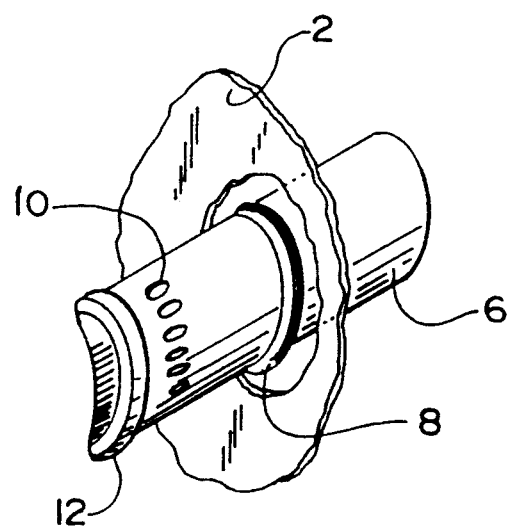
FIG. 5. Shows the ashtray in use.

The smoker's ash tray 6 is optional and may be a cylindrically shaped piece of material that slides within a circular aperture(s) in the deflector, see FIG. 5. For convenience the cylinder may be designated with an outer end on the outside of the window and an inner end on the inside of the window. The cylindrical tray connects the interior of the auto with the outside atmosphere in order to draw the ashes off the cigarette, cigar, etc., and vent them to the outside. On the inside portion of the cylinder (that portion the interior side of the deflector) is an annular abutment piece 8 that extends from the curved wall of the tray in order to provide a stop to prevent the tray from being pushed out of the deflector 2.

A series of holes 10 near the outer end of the tray permits the outside atmosphere to draw off the ashes of the cigarettes, etc. placed in the tray. A second abutment means 12 should be near the outer end of the tray in order to allow the tray to be retracted into the inside of the deflector when not in use, see figure. 5. When not in use, the tray is kept on the inside of the deflector and when in use, the tray is pushed out and the side of the tray with the holes communicates with the outside air in order to draw off the ashes. FIG. 5 shows the tray in use.

The material used for the deflector will likely need to be drilled so it should not be one that will crack or shatter upon drilling. For example, acrylic materials tend to crack upon drilling. The preferred material would be a hard coated, polycarbonate material known by the trademarked name of LEXAN and is made by General Electric company, of Pittsfield, Mass.

Care should be taken to choose only those materials that can be readily formed into the desired shape of the deflector. Not all materials can be readily melted and curved in two directions as the deflector needs to be. It is preferred that a vacuum forming process be used, as this seems to mold the LEXAN material quite well. The process would be done at around 350°. Special types of LEXAN may be bullet resistant, one such type is knows as M R 5 LEXAN.

The preferred size of the deflector should be chosen based on the size of the window which of course, depends on the make and model of the vehicle. Dimensions of the deflector should generally be about 33-42" long and about 7-8" in height.

I claim:

1. A window deflector for attachment to window openings in vehicles, said openings having a frame structure and a slot in said frame and a window fixed for sliding within said frame so that the upper edge of said window may engage with said slot, said deflector comprising: a deflector portion having an upper flange, said flange of size and shape adapted to fit said window slot, said deflector having a securing means for securing said deflector in said window slot, said deflector portion made of bullet-resistant material, said deflector having an aperture and a cigarette ash tray in slidable connection with said aperture, said ashtray comprising: a cylindrical element having an open end and a closed end so that a cigarette may be rested in said open end, said closed end having holes for venting and abutment means in connection with said cylindrical element and located between said open end and said vent holes for preventing said tray from coming out of said aperture.

2. The apparatus of claim 1 wherein said bullet resistant material is LEXAN.

3. The apparatus of claim 1 wherein said deflector portion has a lower edge, said lower edge having a means for providing a substantially water proof seal in connection with said upper edge of said window.

4. A window wind deflector having a cigarette ash tray, said deflector having an aperture and said being ashtray in slidable connection with said aperture, said ashtray comprising: a cylindrical element having an open end and a closed end so that a cigarette may be rested in said open end, said closed end having holes for venting, an abutment means in connection with said cylindrical element and located between said open end and said vent holes for preventing said tray from coming out of said aperture.

5. A window deflector for attachment to window openings in vehicles, said openings having a frame structure and a slot in said frame and a window fixed for sliding within said frame and engaging said slot, said deflector comprising: a deflector portion having an upper flange, said flange of size and shape adapted to fit said upper window slot, said deflector having a securing means for securing said deflector in said window slot, said deflector portion having a lower edge, said lower edge having a means for providing a weather proof seal in connection with the upper edge of said window, said deflector having an aperture, a cigarette ash tray in slidable connection with said aperture, said ashtray comprising: a cylindrical element having an open end and a closed end so that a cigarette may be rested in said open end, said closed end having holes for venting, an abutment means in connection with said cylindrical element and located between said open end and said vent holes for preventing said tray from coming out of said aperture.

* * * * *